United States Patent [19]

Cordie

[11] Patent Number: 5,510,144
[45] Date of Patent: Apr. 23, 1996

[54] PROCESS FOR PREVENTING HEAVY METAL MIGRATION IN CRYSTAL ARTICLES

[75] Inventor: Paul Cordie, Bouxwiller, France

[73] Assignee: Lalique S.A., France

[21] Appl. No.: 182,447

[22] Filed: Jan. 18, 1994

[30] Foreign Application Priority Data

Jan. 26, 1993 [FR] France ................................ 93 00709

[51] Int. Cl.⁶ ..................... C03C 17/00; C03C 15/00; C03C 23/00
[52] U.S. Cl. ................. 427/237; 427/248.1; 65/30.1; 65/30.13; 65/60.1; 65/60.7
[58] Field of Search ................................ 427/237, 248.1; 501/60, 74; 65/30.1, 30.13, 60.1, 60.7

[56] References Cited

FOREIGN PATENT DOCUMENTS 458713A    11/1991    European Pat. Off. .
609116A    8/1994     European Pat. Off. .
4102886    8/1992     Germany .

*Primary Examiner*—Roy V. King
*Attorney, Agent, or Firm*—Bierman and Muserlian

[57] ABSTRACT

Crystal articles are treated at high temperature by a gas produced by the vaporization of sulfate(s) of ammonium and of aluminum or of iron. For example, a temperature of 480° C. is maintained for 15 minutes to 3 hours. After the article has cooled, the initial purity of the treated surface can be restored simply by washing the treated surface with water or soapy water. The process is carried into practice by placing the treatment powder 4 at the bottom of the article 1 to be treated and closing the opening 2 of the article 1 by means of a graphite plate 5. A device 8 holds the plate 5 in the opening 2. The invention provides a means of limiting the migration of heavy metals, such as lead, for articles made from crystal.

7 Claims, 1 Drawing Sheet

PROCESS FOR PREVENTING HEAVY METAL MIGRATION IN CRYSTAL ARTICLES

This invention relates to the field of the surface treatment of articles made from crystal.

BACKGROUND OF THE INVENTION

It is already known that certain kinds of glass are obtained from mixtures of mineral oxides which also included heavy metals oxides, such as lead oxides. In particular, crystal, by definition, contains at least 24% lead oxide. In this description, the term "crystal" will designate lead glass of whatever lead content, and in a general way any glass containing heavy metals.

When glass is in contact with products, particularly food products, a migration of some mineral elements of the glass is observed, which, although vitreous in nature, is not totally chemically inert. This process has been observed in glass receptacles containing liquids such as water, and especially liquids having an acidic pH. The case of crystal receptacles has been the object of high-level research due to the migration of lead and to the so-called risks to which it exposes consumers. Regulations are appearing in a number of countries to limit the maximum lead content of drinks after coming into contact with crystal receptacles. For example, in California, the value over which a specific indication becomes obligatory has been fixed (proposition 65) at 25 ppb (parts per billion) measured according to Standard ISO 7086. It should also be noted that the standard currently in force in the USA sets the maximum lead content in alcoholic drinks at 300 ppb.

The method for measuring the migration of lead is standardized by Standard ISO 7086, and consists in measuring the lead content in a 4% acetic acid solution after being left to stand for 24 hours at an ambient temperature of 22° C.

A great deal of effort is now being channeled into finding processes for treating crystal surfaces in order to block the migration of heavy metals, especially lead, towards the products with which the crystal is, in contact. This concerns a large number of articles of the goblet and glass type, and all kinds of receptacles such as flasks, carafes, jugs, etc.

Surface treatments are also being sort that will better conserve the surface state of articles that are subjected to frequent washing in automatic dish washing machines.

An example of bibliographic references illustrating the state of the art in the field of the invention, especially the migration of lead into products in contact with crystal, is represented by the Ceramic Bulletin volume 55 No. 5 (1976) pages 508 and following, which shows the influence of the liquid's pH on the migration of lead. An article in the Journal of the Am Ceramic Society Volume 61 No. 7,8 (1978) pages 292 and following is devoted to a theoretical study of the determination of the activation energy of the ionic exchange between the $H^+$ ions of the liquid and the $Pb^{++}$ ions.

Several techniques have already been defined to limit lead migration into products, particularly with respect to liquids brought into contact with crystal articles.

An initial suggestion was to modify the composition of the glass itself. For example, the suggestion was made to modify the $Al_2O_3$ content of a crystal: refer, for example, to SCHAEFFER and al in Berichte der deutschen Keramischen Gesellschaft Volume 53 (1976) No. 2 pages 43–78, who observed that the introduction of 3% $Al_2O_3$ into a crystal was sufficient to reduce the speed and quantity of migrating lead by a factor of 10. This type of technique, however, is not easy to carry into practice since it involves complete modification of the glass compositions which results in high costs because of the disruption caused to the manufacturing process.

Another technique consists in conserving the conventional composition of the glass or crystal, but performing a surface treatment in order to block the migration of lead. By way of example, in patent application EP-0 458 713, the surface to be treated is coated with a suspension of kaolin to provide a surface film, which is then treated at high temperature, the film then being removed, once the article has cooled, by washing in water and then by sand or ultrasound. This document also contains a detailed description of the technical problems that are encountered in the field of the invention. The drawbacks of the process described in this patent application EP-0 458 713 reside in its carrying into practice, which calls for a barbotine to be casted on the surface to be treated, and above all in the operations for removing the film which are both long and costly and which may also degrade the surface state of the article.

Document DE-A-41 02 886 describes the treatment of glass articles in order to limit the transfer of the heavy metals that they contain. The procedure involves the use of an extraction agent in an aqueous solution and is performed at low temperature, notably less than 100° C.

Other types of treatment exist such as treatments using concentrated sulfuric acid, but the results obtained are unsatisfactory and unstable in time.

The surface treatment technique using ammonium sulfate has been known for a long time, and has been the object of several recent papers, particularly at the 1992 International Crystal Federation (ICF) congress (Technical Exchange Conference). According to the authors of these papers, treatments using ammonium sulfate give good results for slowing down lead migration.

The Applicant set out to find an improved process coming within the scope of the general technique of the surface treatment of glass articles containing heavy metals, that is easy to carry into practice and which gives results hitherto unattained in blocking the migration of lead into the products, especially liquids, brought into contact with said articles.

OBJECTS OF THE INVENTION

The object of the invention is therefore a process for the surface treatment of crystal articles, wherein the surface of the article to be treated is brought into contact with a reactive gas produced by the vaporization of sulfate(s) of ammonium and of a metal chosen from aluminum and iron, at high temperature not exceeding the softening temperature of the crystal and, after the article is cooled, at least the treated surface is washed to remove any powdery residue.

SUMMARY OF THE INVENTION

According to a first embodiment of the invention, the treatment agent is ammonium aluminum sulfate having the formula $NH_4Al(SO_4)_2$. It is well known that this substance is generally available in hydrate form. The invention covers any form, provided it can be vaporized at the treatment temperatures hereinafter indicated. Good practical results were obtained with the substance $NH_4 Al (SO_4)_2 \cdot 12H_2O$.

According to an alternative embodiment of the invention, a mixture of ammonium sulfate and aluminum sulfate can be used instead of ammonium aluminum sulfate. This embodiment can be carried into practice if aluminum sulfate and ammonium sulfate are available separately.

According to a further embodiment of the invention, the treatment agent is ammonium iron sulfate. A ferrous salt having the formula $(NH_4)_2 Fe (SO_4)_2$, or ferric salt having the formula $NH_4 Fe (SO_4)_2$ can be used. In the same way as ammonium aluminum sulfate, these ammonium iron sulfates are often available in hydrate form, for example, $(NH_4)_2 Fe (SO_4)2 \cdot 6H_2 0$ and $NH_4 Fe (SO_4)_2 \cdot 12H_2 0$. It must however be understood that the process of the invention can be carried into practice with any and all hydrate forms of such sulfates that can be vaporized at the treatment temperatures.

In an alternative embodiment, mixtures of ammonium sulfate and iron sulfate can also be used (Fe II or Fe III).

The process of the invention is carried into practice at high temperature, this temperature being in all cases above the glass transition temperature but not exceeding the crystal softening temperature. In the case of a crystal, whose softening temperature is in the order of 490° C.–500° C., the process of the invention can be applied at a temperature beyond 470° C. but not exceeding the softening temperature, preferably in the range of about 470°–490° C. The choice of the treatment temperature can be optimized according to the nature of the glass to be processed, as well as the mechanical strength of the article at said temperature.

It is appropriate to keep the surface of the crystal article to be treated in contact with the gas produced by the vaporizing of the treatment agent for as long as it takes the gas to react with said surface. The formation of a whitish deposit can be seen on the surfaces thus treated. Here again, those skilled in the art can adapt the treatment time according to the article to be treated, to the temperature finally retained for the treatment and to the other parameters of the process. In practice, for crystal, good results were obtained with a treatment time ranging from fifteen minutes to three hours at a temperature in the region of 475°–480° C., starting from the moment this temperature was reached. This period corresponds to the treatment stage and does not include the rise in temperature or cooling of the article.

To carry the process of the invention into practice, it is appropriate to work in a closed enclosure and to expose the surface or surfaces to be treated to the action of the reactive gas produced by the treatment agent. The treatment installations are compatible with the shape of the articles to process. Indeed, as already described above, the invention applies to any article made from crystal of which certain surfaces, at the time of use, come into contact with food or drink: it therefore relates to all kinds of article such as plates, bowls, dishes, flasks, carafes, jugs, glasses, without this being an exhaustive list.

For some articles, it may be necessary to provide a closed enclosure containing supports for said articles as well as means for vaporizing the treatment agent inside the enclosure.

The shape of the article itself can also be used to advantage by using it to form a closed enclosure and thus simplify the practical conditions of the treatment. This is the case for example of articles comprising an opening, such as glasses, flasks, carafes, etc. The opening of these articles is arranged at an end opposite their base. To treat such articles according to the invention, they are simply placed with the opening at their upper part, said upper part being arranged in a substantially horizontal plane. The surface to treat is in this case the interior of the article. Given that the treatment agent is available in powder form, it is convenient to directly deposit the quantity required at the bottom of such an article, and then to close the opening with a plate made from a material that is resistant at the treatment temperature, for example graphite, and which is simply placed at the upper part of the article. The best results concerning the physical holding of the plate in position on the opening were obtained when said plate was fitted with an device that penetrated into the article and prevented unwanted movements of the plate on the opening.

One alternative embodiment which has also given good results consists in providing a graphite covering plate with a rod that penetrates downwardly inside the article and which carries a pod in which the powdery treatment agent is deposited.

Whatever embodiment is adopted, the assembly containing the powder is closed by the plate, heated to the treatment temperature, and maintained at this temperature for a sufficiently long period of time.

During the treatment, the powder vaporizes and the gas thus formed reacts with the exposed glass or crystal surfaces of the article. A whitish deposit forms on the treated walls.

After cooling, the presence of residual unsublimated treatment agent is observed.

With respect to the quantity of treatment agent to use, this must be adapted to the area of the surfaces to be treated. It is appropriate to chose an excess in quantity to ensure that the quantity of reactive gas produced by vaporization will be sufficient to provide the desired protection of the walls or surfaces to be treated. It was nevertheless noticed that the quantity of treatment agent introduced is not an essential characteristic parameter of the process. For example, for the treatment of crystal carafes or flasks having an internal volume of 0.3 l, quantities of treatment agent in the order of 150–200 mg are deemed appropriate in practice. Those skilled in the art would be able to optimize without difficulty the quantity of powdery treatment agent to use in each particular case.

The last stage in the process of the invention consists in removing the whitish deposits present on the treated surfaces. According to one particularly advantageous feature of the invention, the powdery residue can be completely removed and the surface of the glass or crystal article restored to its original transparency simply by washing with water or soapy water. Using the treatment agent of the invention makes for a much simpler final washing operation compared to some known procedures of the prior art.

The treatment of the invention can be carried out on articles already produced, i.e. already annealed. This treatment can therefore be carried into practice on articles which are already at ambient temperature, as they would be after cooling in normal manufacturing conditions. It is also possible to apply the treatment to articles during manufacture which are still at a high temperature before their final cooling.

The results obtained by the process of the invention are remarkable on all counts. The tests carried out demonstrate that the protection of articles against the migration of certain heavy metals, especially lead, towards the food products with which they are in contact, is blocked at a ratio hitherto unattained and significantly higher than that of the same articles treated in the same conditions with ammonium sulfate only. Thanks to the invention, the quantity of lead is undetectable or practically insignificant, even after very long contact periods. Such quantities are significantly lower than those which have been the object of even the most stringent recent regulations. In the case of the treatment of crystal, the value of the quantity of lead likely to undergo migration does not exceed 5 ppb.

Another advantage of the process according to the invention is that it can be put into practice in a wide range of temperature, for instance between 470° C. and 490° C. On the contrary, an extremely important drawback of other known treatment agents such as ammonium sulfate, is that they are active only at a precise temperature. On the one hand, this temperature is difficult to control and on the other hand, is far too close to the softening temperature of the article to be treated with. Therefore, the ammonium sulfate cannot be used because first of all, the protection's results are not sufficient or uncertain and then, the temperature of treatment to be observed leads to an unacceptable distortion of the crystal articles.

The invention will be better understood from the following non-limiting description of a number of examples of the invention which should be read in conjunction with the attached drawings. In these drawings:

BRIEF DESCRIPTION OF THE DRAWINGS

FIG. 1 schematically shows an axial section of a carafe or flask type crystal article, designated by the general reference 1, comprising an opening 2 at its upper end and a base 3. According to this embodiment, the powdery treatment agent 4 is simply deposited at the bottom of carafe 1. A graphite plate 5 is placed at the upper part of carafe 1 to close opening 2. An device or nail 8, traversing plate 5 and penetrating into article 1 through opening 2, prevents plate 5 from sliding laterally.

In the alternative embodiment shown in FIG. 2, the same reference numbers designate the same elements. In this case, the powdery treatment agent 4 is deposited in a pod 7 suspended from graphite plate 5 by rod 6.

Figure 1:
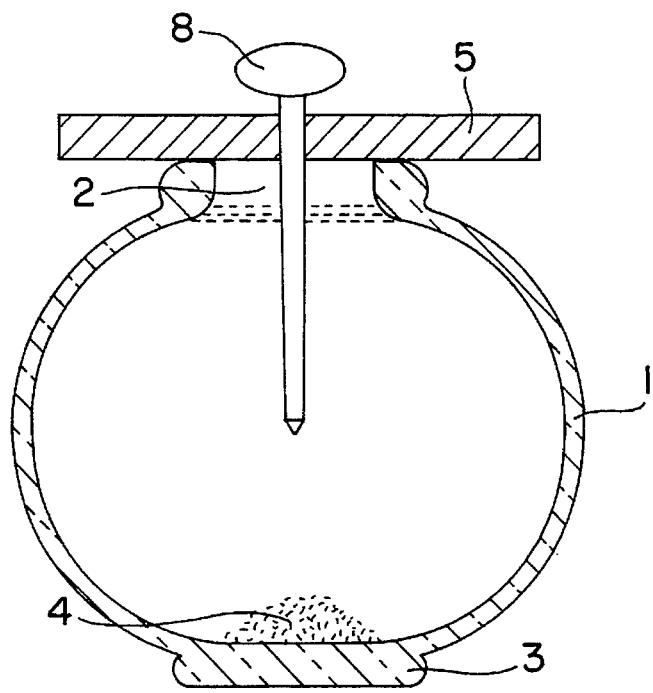
FIG. 1 is an axial section of a device for carrying into practice the process of the invention.
Figure 2:
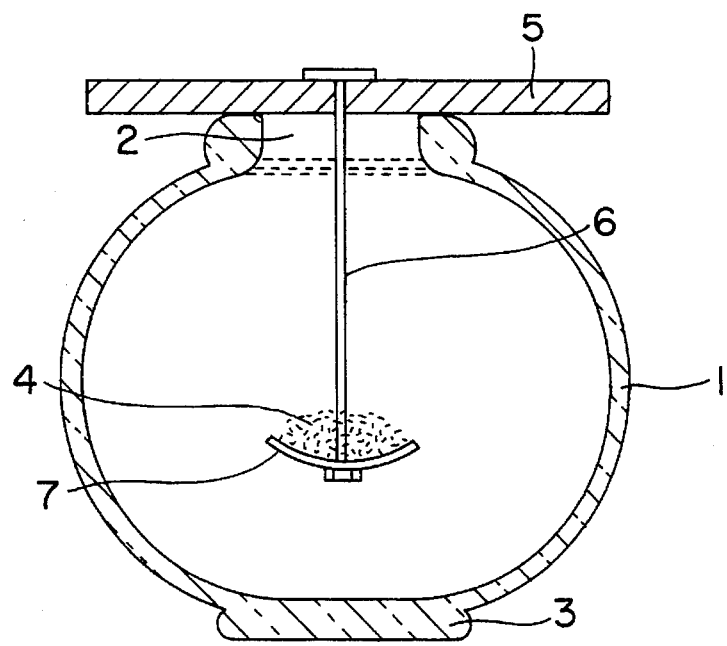
FIG. 2 is a similar axial section of an alternative device for carrying into practice the process of the invention.

In the examples that follow, treatments according to the invention were carried out on carafes of the general type shown in FIGS. 1 and 2, in compliance with the two embodiments shown respectively in said figures.

Example 1

The powdery agent used consisted of 200 mg of ammonium aluminum sulfate, the internal volume of the carafes being in the order of 0.3 l. After the ammonium aluminum sulfate had been put in place, whether at the bottom of the carafe as shown in FIG. 1 or in the pod suspended from the graphite plate as shown in FIG. 2, the carafes were closed with the plate, the assembly then being placed in a stove and heated. Given that the carafes are made from crystal, the treatment temperature was allowed to rise to 480° C. and was maintained at this value for two hours. The carafes were then allowed to cool after which the graphite closing plates were removed and the inside of the carafes washed using simply soapy water in order to remove the whitish deposits present on the wall.

Example 1a

In a first series of experiments, the results obtained according to the invention were compared, on the one hand, with those given by identical untreated carafes, and on the other hand with those given by carafes treated only with ammonium sulfate $NH_4 (SO_4)_2$ according to the prior art. Standard ISO 7086 was applied in these tests, and the quantity of lead having migrated was measured by means of a vapor phase atomic spectrometer.

The results are summarized in the table I.

TABLE I

| Pb Migration Ratio Standard ISO 7086 | |
|---|---|
| Untreated carafes | 190 ppb |
| Carafes treated with ammonium sulfate alone | 30 ppb |
| Carafes treated with ammonium aluminum sulfate | Undetectable <2 ppb |

Example 1b

In another series of experiments, a measurement protocol was used based on the ISO 7086 standard but corresponding to an accelerated treatment which required placing in contact with 4% acetic acid at 62° C. for nine days. It is accepted that this type of test is equivalent to a contact period of practically twenty months at ambient temperature. The results obtained in the accelerated treatment are summarized in table II.

TABLE II

| Pb Migration Ratio - Accelerated Treatment | |
|---|---|
| Untreated carafes | 2,390 ppb |
| Carafes treated with ammonium aluminum sulfate | 5 ppb |

Example 1c

Another series of experiments were carried out in conditions similar to those for the experiments summarized in table I but at various temperatures. The results are reported in table III.

TABLE III

| | Pb Migration Ratio Standard ISO 7086 | | | | |
|---|---|---|---|---|---|
| Temperature | 430° C. | 475° C. | 490° C. | 500° C. | 515° C. |
| Ammonium sulfate | 265 ppb | 64 | undetectable | 30 | 74 |
| Ammonium aluminum sulfate | 150 ppb | 14 | undetectable | undetectable | 23 |

The above results show that the treatment according to the invention using ammonium aluminum sulfate substantially reduces the lead migration ratio compared to untreated articles. It should also be noted that the process of the invention can be carried into practice over a wider range of temperature than is possible with ammonium sulfate alone. At the sole temperature (490° C.) in which the ammonium sulfate gives a satisfactory result for the migration of lead, the crystal articles start softening and become deformed after the treatment.

It was further observed when carrying the process of the invention into practice that the crystal could be restored to its original state and transparency and all visible traces of residue removed by simply washing it with soapy water.

Example 2

Results practically equivalent to those of example 1 were obtained by replacing the ammonium aluminum sulfate with a mixture of 130 mg of ammonium sulfate and 130 mg of aluminum sulfate.

Example 3

The experiments were conducted as in Example 1, but the treatment agent used was ammonium iron sulfate in the form $NH_4 Fe(SO_4)_2$ using 150 mg per test, with treatment conditions identical to those of Example 1. The results obtained were compared, on the one hand, with those given by ammonium sulfate alone, and on the other hand, with those given by ammonium aluminum sulfate. Table IV shows the results after a treatment time of two hours at the indicated temperatures, the lead migration value, expressed in ppb, having been measured according to Standard ISO 7086.

TABLE IV

| | Pb Migration Ratio - Standard ISO 7086 | | |
|---|---|---|---|
| | $(NH_4)_2SO_4$ | $NH_4Al(SO_4)_2$ | $NH_4Fe(SO_4)_2$ |
| 450° C. | 22 | 2 | 5 |
| 460° C. | 10 | 5 | 3 |
| 470° C. | 107 | 8 | 2 |
| 480° C. | 41 | 1 | 1 |
| 490° C. | 171 | 12 | 10 |

The invention is not limited to the embodiments described in the examples above. The new process yields excellent results in preventing the migration of heavy metals from glass in contact with products, such as liquids, particularly liquids with an acidic pH. It was also noticed that the process improves the chemical durability of the articles treated, which is particularly important in preventing their progressive deterioration as a result of repetitive washing in automatic dish washing machines.

What is claimed is:

1. A process for the surface treatment of crystal articles to prevent heavy metal migration comprising contacting the surface of the crystal article with a reactive gas produced by vaporization of a metal sulfate selected from the group consisting of ammonium aluminum sulfates, mixtures of ammonium sulfate and aluminum sulfate, ammonium iron sulfates and mixtures of ammonium sulfate and iron sulfates and hydrates thereof at an elevated temperature not greater than the softening temperature of the crystal, cooling the crystal article and water washing the crystal surface to remove any residual powder.

2. The process of claim 1 wherein the metal sulfate is selected from the group consisting of ammonium aluminate sulfate and hydrates thereof.

3. The process of claim 1 wherein the metal sulfate is a mixture of ammonium sulfate and aluminum sulfate.

4. The process of claim 1 wherein the metal sulfate is selected from the group consisting of $(NH_4)_2Fe(SO_4)_2$, $NH_4Fe(SO_4)_2$ and hydrates thereof.

5. The process of claim 1 wherein the metal sulfate is a mixture of ammonium sulfate and ferrous sulfate or ferric sulfate.

6. The process of claim 1 wherein the elevated temperature is 470° to 490° C.

7. The process of claim 6 wherein the temperature is maintained for 15 minutes to 3 hours.

* * * * *